(12) United States Patent
Akutsu et al.

(10) Patent No.: US 10,673,309 B2
(45) Date of Patent: Jun. 2, 2020

(54) INVERTER-INTEGRATED MOTOR

(71) Applicant: Mitsubishi Electric Corporation, Tokyo (JP)

(72) Inventors: Satoru Akutsu, Tokyo (JP); Yoshihito Asao, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 21 days.

(21) Appl. No.: 15/743,359

(22) PCT Filed: Aug. 5, 2015

(86) PCT No.: PCT/JP2015/072216
§ 371 (c)(1),
(2) Date: Jan. 10, 2018

(87) PCT Pub. No.: WO2017/022094
PCT Pub. Date: Feb. 9, 2017

(65) Prior Publication Data
US 2018/0198351 A1  Jul. 12, 2018

(51) Int. Cl.
*H02K 11/33* (2016.01)
*H02K 7/00* (2006.01)
*H02K 11/215* (2016.01)
*H02K 5/10* (2006.01)
*H02K 5/16* (2006.01)

(52) U.S. Cl.
CPC .............. *H02K 11/33* (2016.01); *H02K 7/003* (2013.01); *H02K 5/10* (2013.01); *H02K 5/161* (2013.01); *H02K 11/215* (2016.01)

(58) Field of Classification Search
CPC .............................. H02K 11/33; H02K 11/215
USPC ......................................... 310/68 D, 68 R, 43
See application file for complete search history.

(56) References Cited

U.S. PATENT DOCUMENTS

2004/0050155 A1* 3/2004 Okazaki .................. G01F 1/684
73/204.22
2007/0246289 A1* 10/2007 Tominaga ............ B62D 5/0406
180/444
2011/0273042 A1 11/2011 Isoda et al.
(Continued)

FOREIGN PATENT DOCUMENTS

CN  103066787 A  4/2013
EP  2695795 A1   2/2014
(Continued)

OTHER PUBLICATIONS

International Search Report for PCT/JP2015/072216, dated Oct. 27, 2015.
(Continued)

*Primary Examiner* — Terrance L Kenerly
(74) *Attorney, Agent, or Firm* — Sughrue Mion, PLLC; Richard C. Turner

(57) ABSTRACT

An inverter-integrated motor according to the present invention is configured such that an inverter module and a motor are integrated so as to line up in an axial direction of the motor, the inverter module is configured into a single member in which are integrated: a power portion that includes an inverter; and a control portion that includes a microcomputer, and the motor includes: a rotor; a stator; and a pair of housings that include bearings that support a shaft of the rotor.

8 Claims, 10 Drawing Sheets

(56) References Cited

U.S. PATENT DOCUMENTS

| | | |
|---|---|---|
| 2012/0161590 A1 | 6/2012 | Yamasaki et al. |
| 2013/0099609 A1 | 4/2013 | Ikeno et al. |
| 2013/0141871 A1 | 6/2013 | Omae et al. |
| 2014/0151146 A1 | 6/2014 | Tanaka et al. |
| 2014/0152130 A1* | 6/2014 | Shimano ............ H02K 11/046 310/71 |
| 2014/0354087 A1 | 12/2014 | Kato et al. |

FOREIGN PATENT DOCUMENTS

| | | | | |
|---|---|---|---|---|
| EP | 2840686 A1 | | 2/2015 | |
| JP | 2009-224707 A | | 10/2009 | |
| JP | 2010-269693 A | | 12/2010 | |
| JP | WO2012029706 | * | 3/2012 | ............ H02K 11/33 |
| JP | 2013-062923 A | | 4/2013 | |
| JP | 2014-131463 A | | 7/2014 | |
| JP | 2014-143841 A | | 8/2014 | |
| WO | 2012/060123 A1 | | 5/2012 | |
| WO | 2013/111277 A1 | | 8/2013 | |
| WO | WO-2013111277 A1 | * | 8/2013 | ............... H02K 5/18 |
| WO | 2013/157066 A1 | | 10/2013 | |
| WO | 2014/054098 A1 | | 4/2014 | |

OTHER PUBLICATIONS

Communication dated Nov. 27, 2018, from Japanese Office Action in counterpart application No. 2017-532313.

Communication dated Nov. 30, 2018, from European Patent Office in counterpart application No. 159004050.

Communication dated Mar. 8, 2019, from the State Intellectual Property Office of People's Republic of China in counterpart Application No. 201580081910.X.

Communication dated Oct. 30, 2019 by the Indian Patent Office in application No. 201847001870.

* cited by examiner

INVERTER-INTEGRATED MOTOR

CROSS REFERENCE TO RELATED APPLICATIONS

This application is a National Stage of International Application No. PCT/JP2015/072216 filed Aug. 5, 2015, the contents of all of which are incorporated herein by reference in their entirety.

TECHNICAL FIELD

The present invention relates to an inverter-integrated motor in which inverter modules and a motor are arranged in an axial direction of the motor and integrated.

BACKGROUND ART

Conventional inverter-integrated motors have been constituted by: a motor that includes: a stator; a rotor; a motor case that holds the stator in an internally fitted state; and a front frame end and a rear frame end that are disposed at two axial ends of the motor case, and that rotatably support the rotor; and a control unit that is constituted by: a power portion through which a driving current that drives the motor is passed; and a control portion that controls driving of the motor. The control unit has been configured by screwing to a heatsink using screws a controlling circuit board to which parts such as a microcomputer that constitutes part of the control portion are mounted, a power board to which parts such as capacitors that constitute part of the power portion are mounted, power modules, a connector, etc. The control unit has been attached so as to be integrated with the motor by attaching the heatsink to the rear frame end using screws, and the cover member has been mounted so as to accommodate the control unit (see Patent Literature 1, for example).

CITATION LIST

Patent Literature

Patent Literature 1: Japanese Patent Laid-Open No. 2014-131463 (Gazette)

SUMMARY OF THE INVENTION

Problem to be Solved by the Invention

In conventional inverter-integrated motors, because the control unit has been configured by screwing a controlling circuit board to which parts such as a microcomputer that constitutes part of the control portion are mounted, a power board to which parts such as capacitors that constitute part of the power portion are mounted, power modules, a connector, etc., to a heatsink using screws, the number of components is large, making the configuration thereof complicated. Because of that, some problems have been that the apparatus is bulky, weight is increased, and assembly man-hours are also increased.

The present invention aims to solve the above problems and an object of the present invention is to provide an inverter-integrated motor in which components can be reduced in number, assembly man-hours can be reduced, and reductions in size and weight can also be achieved.

Means for Solving the Problem

An inverter-integrated motor according to the present invention is configured such that an inverter module and a motor are integrated so as to line up in an axial direction of the motor, the inverter module is configured into a single member in which are integrated: a power portion that includes an inverter; and a control portion that includes a microcomputer, and the motor includes: a rotor; a stator; and a pair of housings that include bearings that support a shaft of the rotor.

Effects of the Invention

In the present invention, because the inverter module is constituted by a single member in which a power portion and a control portion are integrated, the number of components can be reduced, assembly man-hours can be cut, and reductions in size and weight can be achieved.

DESCRIPTION OF EMBODIMENTS

Embodiment 1

Figure 1:
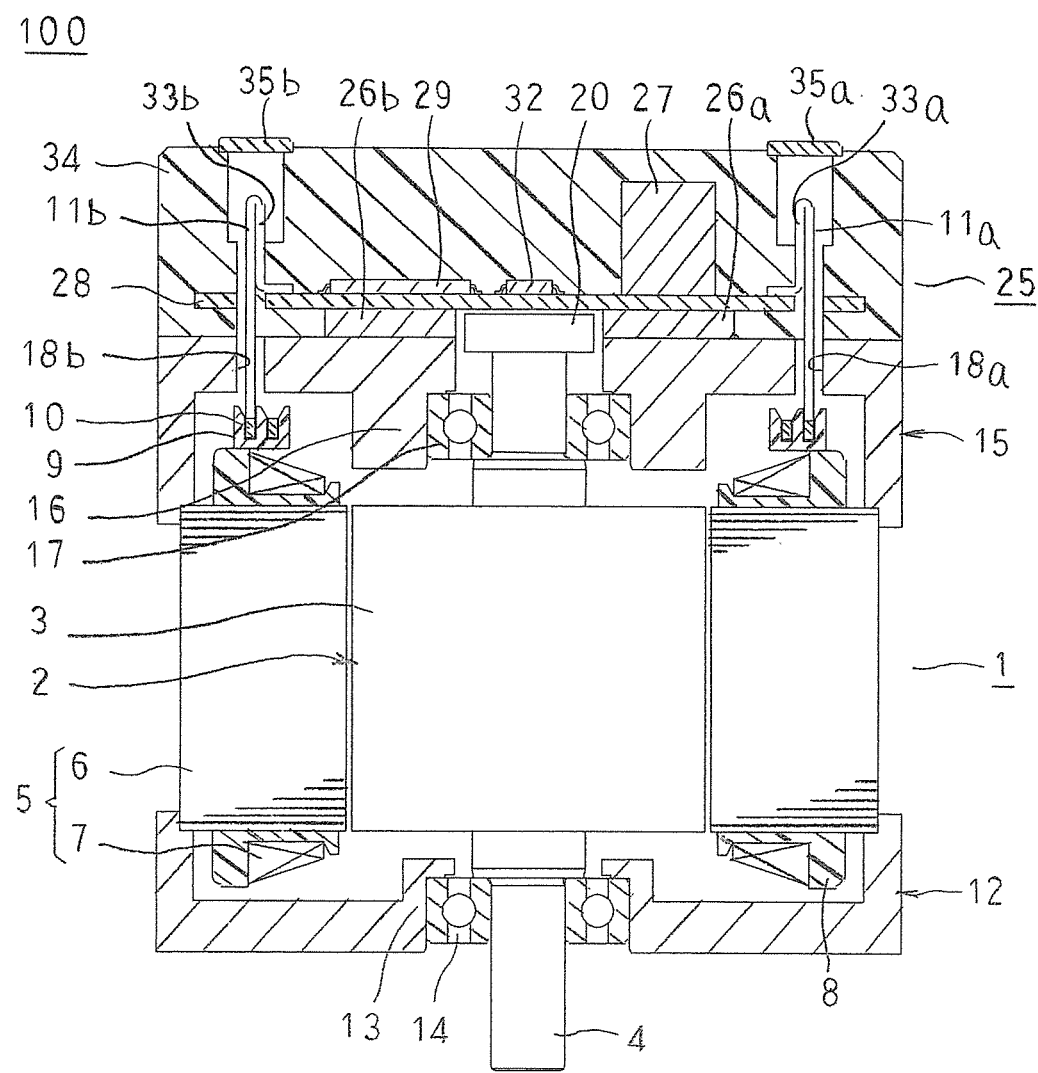
FIG. 1 is a longitudinal cross section that shows an inverter-integrated motor according to Embodiment 1 of the present invention.
Figure 2:
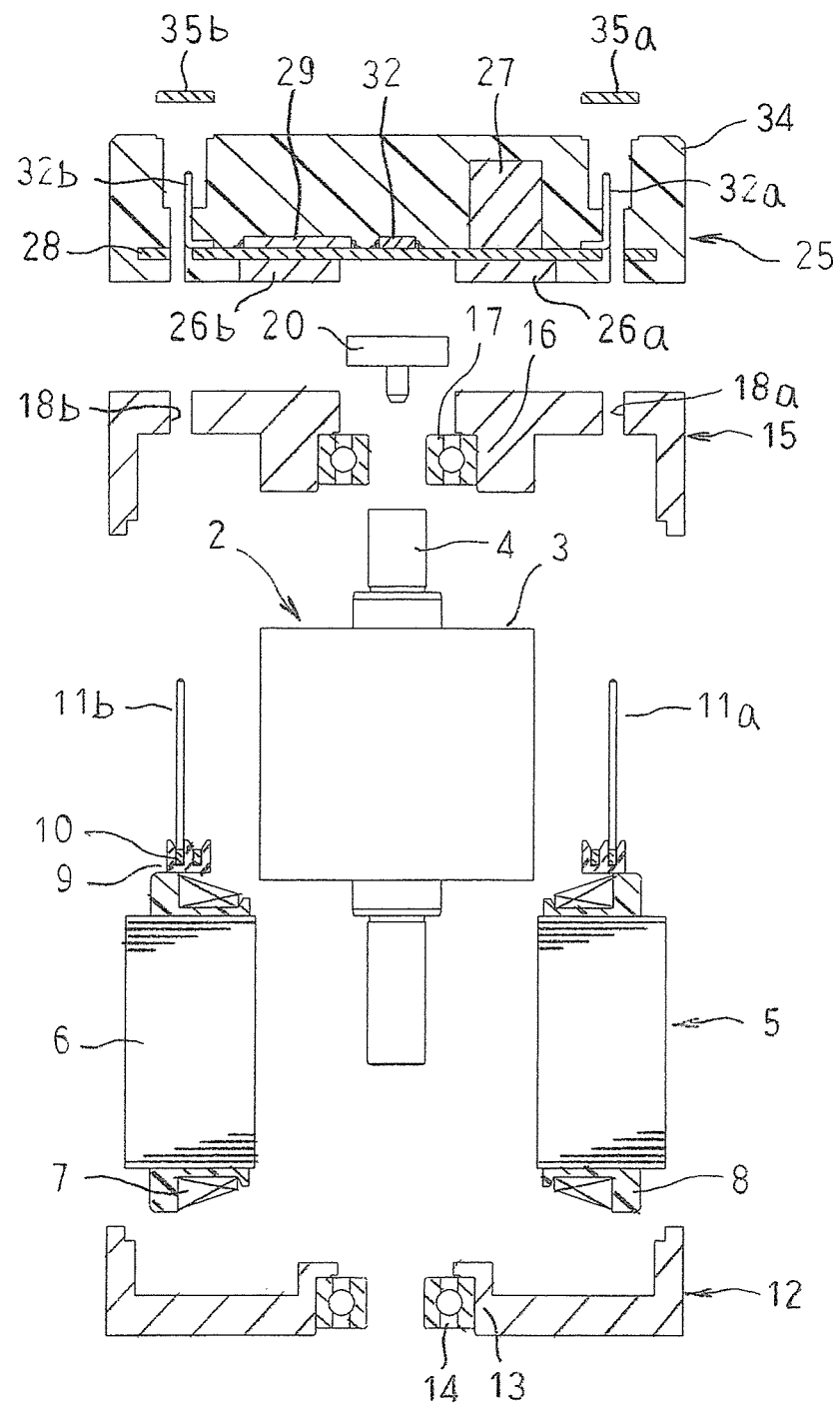
FIG. 2 is a longitudinal cross section that shows an exploded state of the inverter-integrated motor according to Embodiment 1 of the present invention.
Figure 3:
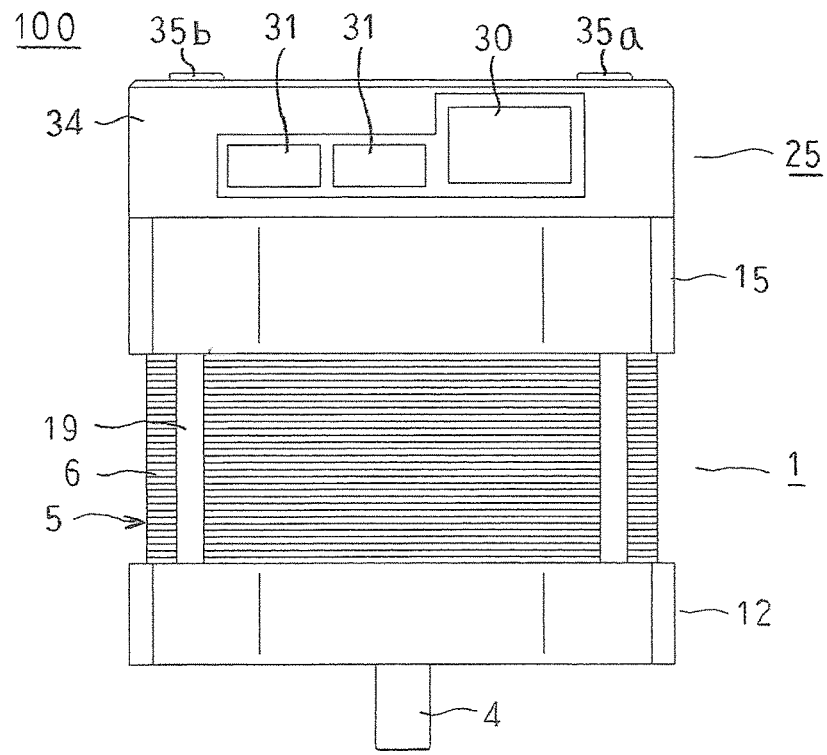
FIG. 3 is a side elevation that shows the inverter-integrated motor according to Embodiment 1 of the present invention.
Figure 4:
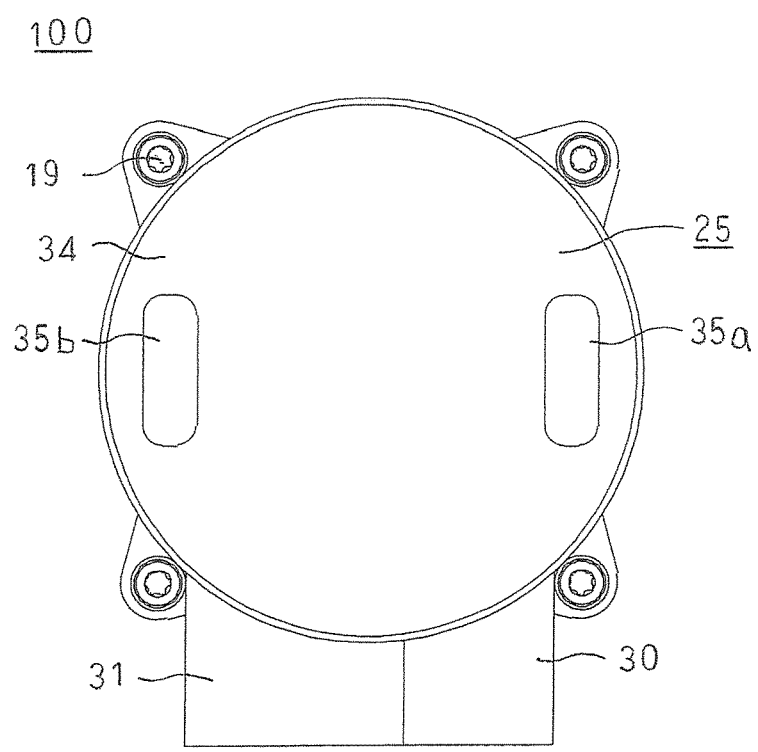
FIG. 4 is an end elevation that shows the inverter-integrated motor according to Embodiment 1 of the present invention when viewed from a non-output shaft end.

FIG. 1 is a longitudinal cross section that shows an inverter-integrated motor according to Embodiment 1 of the present invention, FIG. 2 is a longitudinal cross section that shows an exploded state of the inverter-integrated motor according to Embodiment 1 of the present invention, FIG. 3 is a side elevation that shows the inverter-integrated motor according to Embodiment 1 of the present invention, and FIG. 4 is an end elevation that shows the inverter-integrated motor according to Embodiment 1 of the present invention when viewed from a non-output shaft end. Moreover, a "longitudinal cross section" is a view that represents a plane that includes a motor shaft, and a longitudinal cross section is depicted in FIGS. 1 and 2, except for the rotor.

In FIGS. 1 through 4, in an inverter-integrated motor 100, a motor 1 and an inverter module 25 are arranged in an axial direction of the motor 1 and integrated.

The motor 1 is a permanent-magnet synchronous motor that includes a rotor 2, a stator 5, and a front housing 12 and a rear housing 15 that function as a housing, supply of electric current to and driving thereof being controlled by an inverter module 25.

The rotor 2 includes: a rotor core 3 in which permanent magnets (not shown) are embedded; and a shaft 4 that is inserted through a central axial position of the rotor core 3 and fixed to the rotor core 3.

The stator 5 includes a stator core 6 that is produced by stacking and integrating electromagnetic steel sheets; and a stator coil 7 that is mounted to the stator core 6 so as to have resin insulators 8 interposed. Here, the stator coil 7 is constituted by two sets of three-phase coils. The two sets of three-phase coils are respectively configured into two sets of three-phase alternating-current windings that are wye-connected or delta-connected using winding terminals 10 that are housed in a resin terminal holder 9. Motor terminals 11a and 11b that function as output wires of the two sets of three-phase alternating-current windings are formed on the winding terminals 10. Moreover, in FIGS. 1 and 2, one each of the motor terminals 11a and 11b is depicted, but in reality there are three of each of the motor terminals 11a and 11b.

The front housing 12 is a die-casting of an aluminum alloy, and a front bearing box portion 13 that houses a front bearing 14 that supports an output-end end portion of the shaft 4 is formed at a central axial position thereon. The rear housing 15 is a die-casting of an aluminum alloy, and a rear bearing box portion 16 that houses a rear bearing 17 that supports a non-output-end end portion of the shaft 4 is formed at a central axial position thereon. Apertures 18a and 18b for passage of motor terminals 11a and 11b are formed on the rear housing 15.

The rotor 2 is rotatably held in the front housing 12 and the rear housing 15 such that the two ends of the shaft 4 are supported by the front bearing 14 that is housed in the front bearing box portion 13 and the rear bearing 17 that is housed in the rear bearing box portion 16. In addition, the front housing 12 and the rear housing 15 are fixed by four through-bolts 19 so as to clamp two axial ends of the stator core 6 from two axial directions. A motor 1 in which the rotor 2 is rotatably disposed inside the stator 5 so as to have an extremely small air gap interposed is assembled thereby. A sensor magnet 20 that constitutes a detected portion of a rotation sensor is mounted to the non-output-end end portion of the shaft 4, which protrudes out of the rear housing 15.

The inverter module 25 includes: a power portion through which is passed a driving current that drives the motor 1; and a control portion that controls driving of the motor 1. The power portion is constituted by two sets of inverters 26a and 26b, smoothing capacitors 27, etc., each of the sets being constituted by power elements such as power MOSFETs, etc., for three phases, and is mounted to the circuit board 28. The control portion is constituted by a microcomputer 29, an FET driving circuit (not shown), circuit elements (not shown), etc., and is mounted to the circuit board 28. An electric power supply connector 30 and a signal connector 31 are also disposed on the inverter module 25, and are connected to the power portion and to the control portion by means of terminals (not shown). A sensor IC 32 that constitutes a detecting portion of the rotation sensor is mounted to the circuit board 28. Inverter terminals 33a and 33b are electrically connected to the inverters 26a and 26b, and are mounted to the circuit board 28.

The inverter module 25 is a molded body that is produced by molding together the power portion and the control portion that are configured in this manner. Here, the electric power supply connector 30 and the signal connector 31 are insert-molded, and are formed integrally into a molded resin portion 34. The inverters 26a and 26b are exposed on a first surface of the molded resin portion 34. The circuit board 28 is exposed at a central axial portion of the first surface of the molded resin portion 34, and the sensor IC 32 is mounted to an opposite side of the circuit board 28 from the portion that is exposed from the molded resin portion 34.

The inverter-integrated motor 100 is assembled by fixing the molded resin portion 34 to the non-output-end end surface of the rear housing 15 using adhesive such that the inverters 26a and 26b face toward the rear housing 15 and the sensor IC 32 faces the sensor magnet 20 so as to have the circuit board 28 interposed, and mounting the inverter module 25 to the motor 1 approximately coaxially. Here, the surfaces of the inverters 26a and 26b that are exposed from the molded resin portion 34 contact the non-output-end end surface of the rear housing 15. The control portion is electrically connected to the stator coil 7 by welding the motor terminals 11a and 11b to the inverter terminals 33a and 33b, respectively. The welded portions between the motor terminals 11a and 11b and the inverter terminals 33a and 33b are sealed by covers 35a and 35b.

According to Embodiment 1, a motor 1 is configured such that a stator 5 is clamped and held from two axial directions by a front housing 12 and a rear housing 15, and a rotor 2 is rotatably disposed inside the stator 5 so as to be supported by the front housing 12 and the rear housing 15. An inverter-integrated motor 100 is configured by fixing a molded resin portion 34 of an inverter module 25 that is configured into a single part by molding together a power portion and a control portion to the non-output-end end surface of the rear housing 15 using adhesive. Thus, because the inverter-integrated motor 100 is constituted by five elements, i.e., the rotor 2, the stator 5, the front housing 12, the rear housing 15, and the inverter module 25, the number of components is reduced, assembly man-hours are reduced, cost reductions can be achieved, and reductions in size and weight can also be achieved. Consequently, the present inverter-integrated motor 100 is a motor that is suitable for electric power steering.

The inverter module 25 is molded such that first surfaces of inverters 26a and 26b that constitute heat-generating parts are exposed. The inverter module 25 is mounted to the rear housing 15 such that the surfaces of the inverters 26a and 26b that are exposed from the molded resin portion 34 contact a non-output-end end surface of the rear housing 15. Thus, because heat that is generated by the inverters 26a and 26b is transferred to the rear housing 15, and is radiated from the surface of the rear housing 15, excessive temperature increases in the inverters 26a and 26b are suppressed. In this manner, because the rear housing 15 functions as a heatsink that radiates the heat generated by the inverters 26a and 26b, it is not necessary to equip the inverter module 25 with a heatsink, enabling the number of parts in the inverter module 25 to be reduced, and reductions in cost can be achieved.

Because a sensor IC 32 that constitutes a detecting portion of a rotation sensor is integrated with the inverter module 25, a step of installing the sensor IC 32 is no longer necessary, enabling assembly man-hours to be further reduced, and enabling reductions in cost to be achieved.

Moreover, in Embodiment 1 above, a magnetic sensor that includes a sensor magnet 20 and a sensor IC 32 is used as a rotation sensor, but other types of sensors such as resolvers, etc., may be used.

In Embodiment 1 above, the motor terminals 11a and 11b and the inverter terminals 33a and 33b are welded, but the method for joining the motor terminals 11a and 11b and the inverter terminals 33a and 33b is not limited to welding, and may be press-fitting, crimping, screw fastening, soldering, etc.

In Embodiment 1 above, the inverter module 25 is glued to the rear housing 15, but the method for mounting the inverter module 25 to the rear housing 15 is not limited to adhesive, and may be screw fastening, crimping, thermal adhesion, etc.

In Embodiment 1 above, the direction of removal of the electric power supply connector 30 and the signal connector 31 is a radial direction of the motor 1, but the direction of removal of the electric power supply connector 30 and the signal connector 31 may be removal in an axial direction from a non-output-end end surface of the inverter module 25.

In Embodiment 1 above, a power portion and a control portion are integrated to form a single member by molding, but the method for integrating the power portion and the control portion is not limited to molding provided that the effects can be achieved in a similar manner.

Embodiment 2

Figure 5:
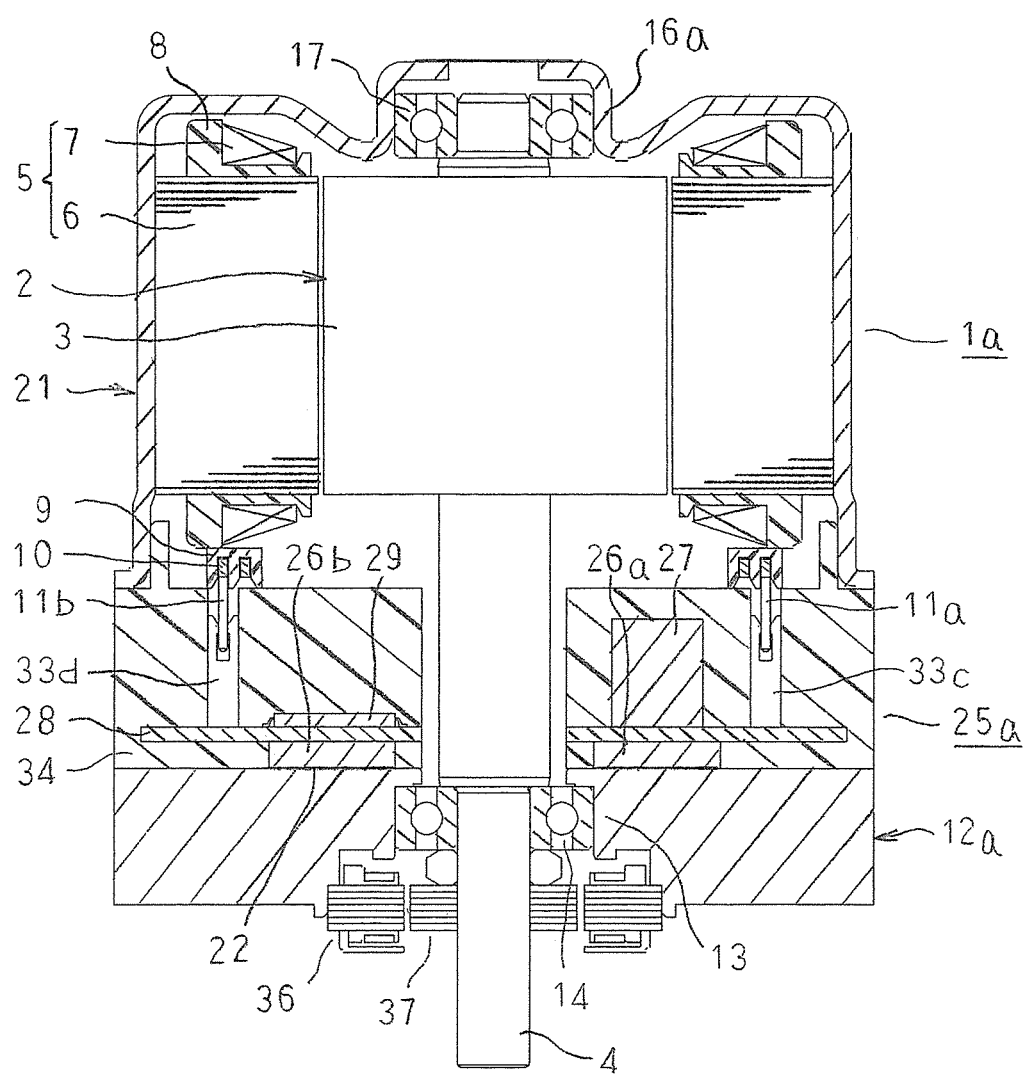
FIG. 5 is a longitudinal cross section that shows an inverter-integrated motor according to Embodiment 2 of the present invention.
Figure 6:
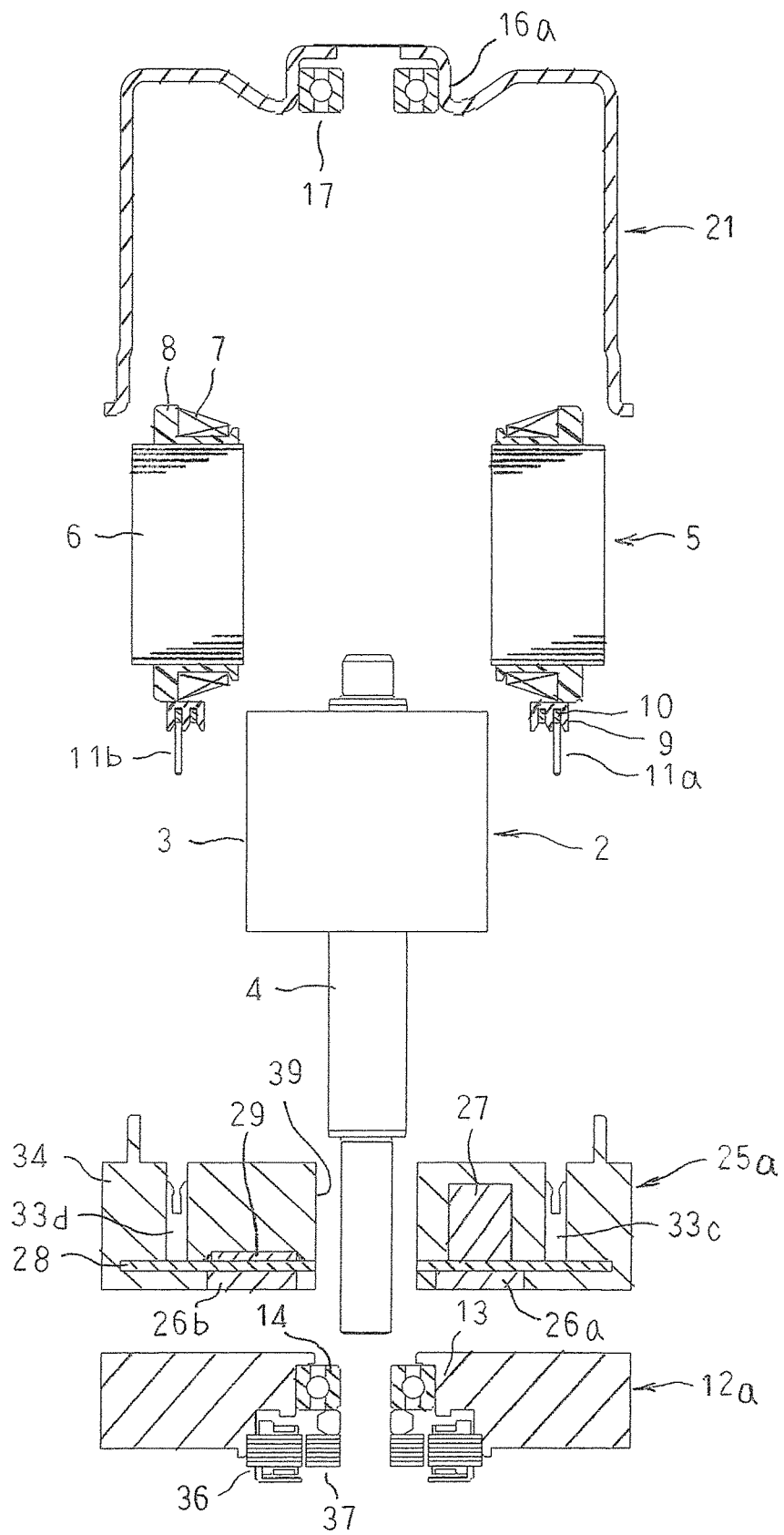
FIG. 6 is a longitudinal cross section that shows an exploded state of the inverter-integrated motor according to Embodiment 2 of the present invention.
Figure 7:
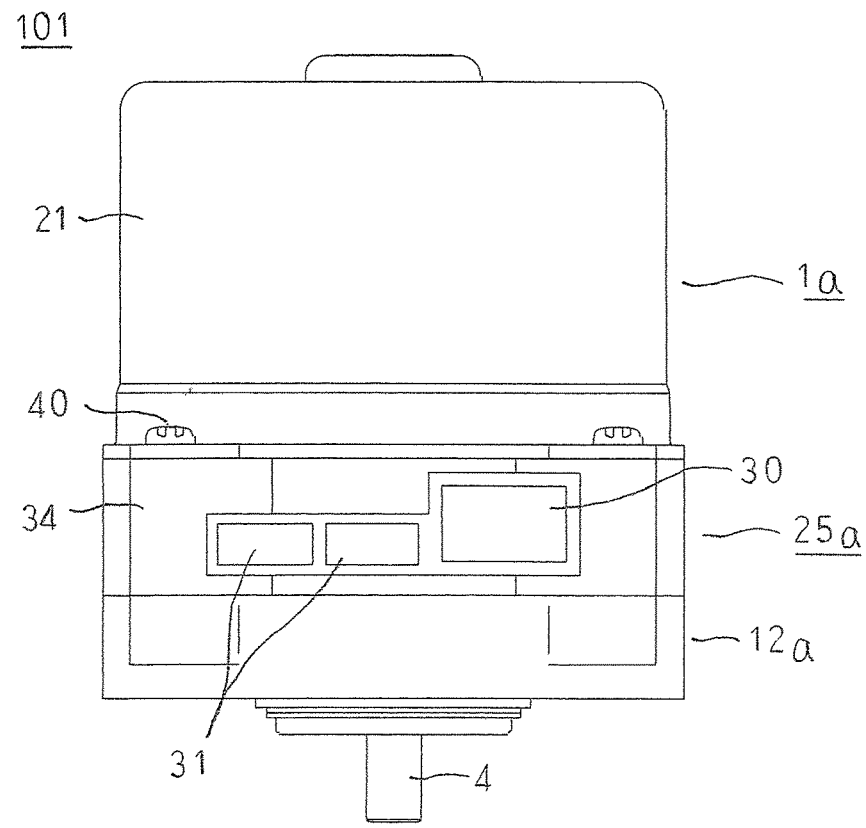
FIG. 7 is a side elevation that shows the inverter-integrated motor according to Embodiment 2 of the present invention.
Figure 8:
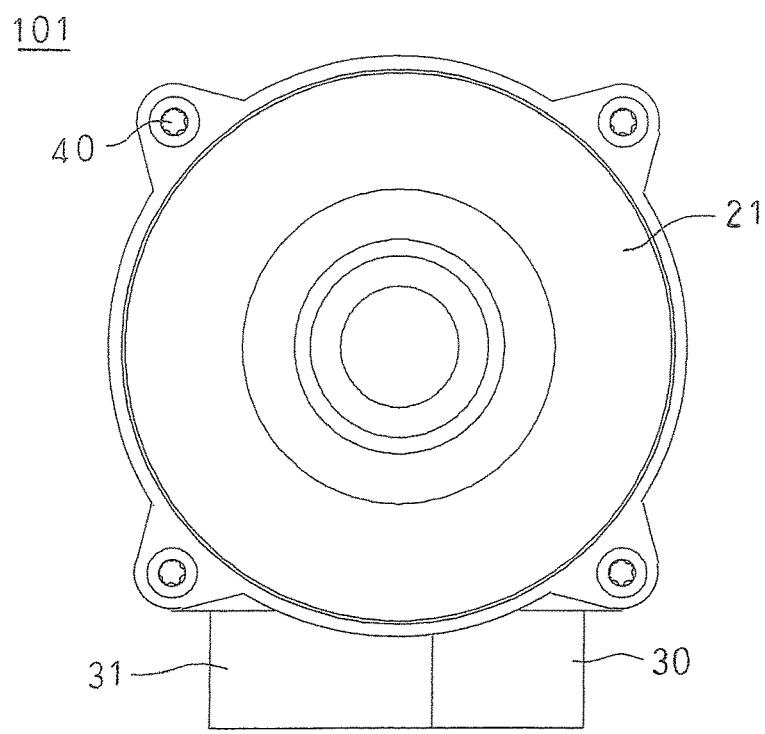
FIG. 8 is an end elevation that shows the inverter-integrated motor according to Embodiment 2 of the present invention when viewed from a non-output end.
Figure 9:
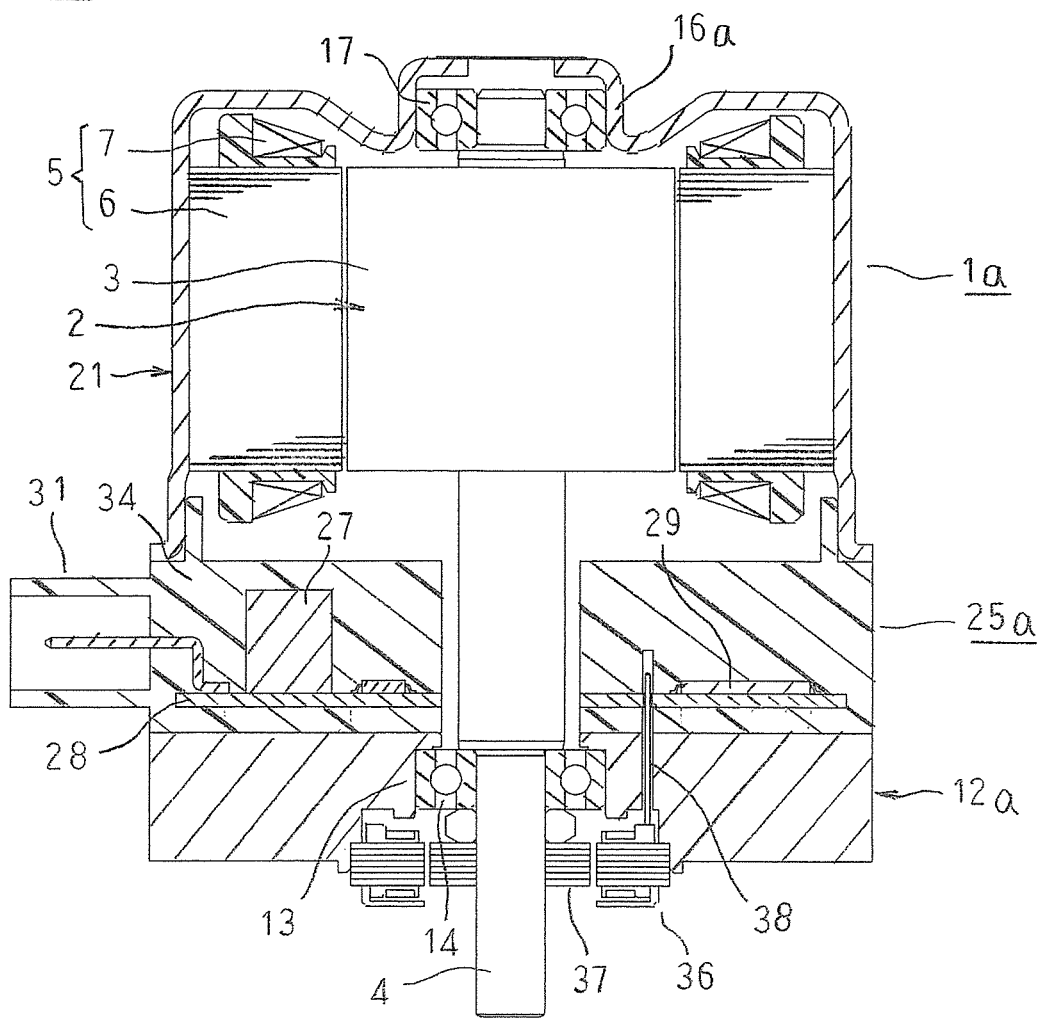
FIG. 9 is a longitudinal cross section that shows the inverter-integrated motor according to Embodiment 2 of the present invention.

FIG. 5 is a longitudinal cross section that shows an inverter-integrated motor according to Embodiment 2 of the present invention, FIG. 6 is a longitudinal cross section that shows an exploded state of the inverter-integrated motor according to Embodiment 2 of the present invention, FIG. 7 is a side elevation that shows the inverter-integrated motor according to Embodiment 2 of the present invention, FIG. 8 is an end elevation that shows the inverter-integrated motor according to Embodiment 2 of the present invention when viewed from a non-output end, and FIG. 9 is a longitudinal cross section that shows the inverter-integrated motor according to Embodiment 2 of the present invention. Moreover, in FIGS. 5 and 6, a longitudinal cross section is depicted except for the rotor. FIG. 9 represents a cross section that is perpendicular to the cross section that is shown in FIG. 5.

In FIGS. 5 through 9, in an inverter-integrated motor 101, a motor 1a and an inverter module 25a are arranged in an axial direction of the motor 1a and integrated.

The motor 1a is a permanent-magnet synchronous motor that includes a rotor 2, a stator 5, and a front housing 12a and a motor housing 21 that function as a housing, supply of electric current to and driving thereof being controlled by an inverter module 25a.

The rotor 2 includes: a rotor core 3 in which permanent magnets (not shown) are embedded; and a shaft 4 that is inserted through a central axial position of the rotor core 3 and fixed to the rotor core 3.

The stator 5 includes a stator core 6 that is produced by stacking and integrating electromagnetic steel sheets; and a stator coil 7 that is mounted to the stator core 6 so as to have insulators 8 interposed. In the stator coil 7, two sets of three-phase coils are respectively configured into two sets of three-phase alternating-current windings that are wye-connected or delta-connected using winding terminals 10. Motor terminals 11a and 11b that function as output wires of the two sets of three-phase alternating-current windings are formed on the winding terminals 10.

The front housing 12a is a die-casting of an aluminum alloy, and a front bearing box portion 13 that houses a front bearing 14 that supports an output-end end portion of the shaft 4 is formed at a central axial position thereof. A resolver stator 36 that constitutes a detecting portion of a rotation sensor is mounted to the front housing 12a coaxially on an output end of the front bearing 14 that is housed in the front bearing box portion 13. Resolver terminals 38 are electrically connected to the resolver stator 36, pass through the front housing 12a, and protrude outward at the non-output end.

The motor housing 21 is press-molding from a cold-rolled steel sheet, is produced so as to have a floored cylindrical shape, and a rear bearing box portion 16 that houses a rear bearing 17 that supports a non-output-end end portion of the shaft 4 is formed at a central axial position of a floor portion thereof. The stator 5 is held in the motor housing 21 by the stator core 6 being inserted into and fixed inside the cylindrical portion of the motor housing 21 by press-fitting or shrinkage fitting.

The rotor 2 is rotatably held in the front housing 12 and the motor housing 21 such that the two ends of the shaft 4 are supported by the front bearing 14 that is housed in the front bearing box portion 13 and the rear bearing 17 that is housed in the rear bearing box portion 16a. A motor 1a in which the rotor 2 is rotatably disposed inside the stator 5 so as to have an extremely small air gap interposed is configured thereby.

The inverter module 25a includes: a power portion through which is passed a driving current that drives the motor 1a; and a control portion that controls driving of the motor 1a. The power portion is constituted by two sets of inverters 26a and 26b, smoothing capacitors 27, etc., each of the sets being constituted by power elements such as power MOSFETs, etc., for three phases, and is mounted to the circuit board 28. The control portion is constituted by a microcomputer 29, an FET driving circuit (not shown), circuit elements (not shown), etc., and is mounted to the circuit board 28. An electric power supply connector 30 and a signal connector 31 are also disposed on the inverter module 25a, and are connected to the power portion and to the control portion by means of terminals (not shown). Inverter terminals 33c and 33d are electrically connected to the inverters 26a and 26b, and are mounted to the circuit board 28.

The inverter module 25a is a molded body that is produced by molding together the power portion and the control portion that are configured in this manner. Here, the electric power supply connector 30 and the signal connector 31 are insert-molded, and are formed integrally into a molded resin portion 34. The inverters 26a and 26b are exposed on a first surface of the molded resin portion 34. A shaft insertion aperture 39 is also formed so as to pass through a central axial position of the molded resin portion 34.

An inverter module 25a that is configured in this manner is mounted to a front housing 12a approximately coaxially by fixing a molded resin portion 3 to a non-output-end end surface of the front housing 12a using an adhesive 4 such that inverters 26a and 26b face toward the front housing 12a. The inverters 26a and 26b are in contact with the non-output-end end surface of the front housing 12a so as to have a heat radiating grease 22 that functions as a thermally conductive member interposed. The resolver stator 36 and the control portion are electrically connected by inserting resolver terminals 38 that pass through the front housing 12a and protrude outward at the non-output end into insertion apertures that are formed on the molded resin portion 34, and press-fitting them into the circuit board 28. The "heat radiating grease" 22 is a grease such as modified silicone, etc., in which particles of a metal or a metal oxide that has a high thermal conductivity are distributed uniformly. The rotor 2 is disposed inside the stator 5, which is held inside the motor housing 21, such that the non-output-end end portion of the shaft 4 is inserted into the rear bearing 17. Then, an output end of the shaft 4 is passed through the shaft insertion aperture 39 of the molded resin portion 34, and is inserted into the front bearing 14, and the motor housing 21 is fastened onto the molded resin portion 34 using screws 40. The motor terminals 11a and 11b are thereby inserted into insertion apertures that are formed on the molded resin portion 34, and are press-fitted into the inverter terminals 33c and 33d, such that the control portion is electrically connected to the stator coil 7. In addition, a resolver rotor 37 that constitutes a detected portion of the rotation sensor is mounted in a vicinity of the output-end end portion of the shaft 4 that protrudes outward from the front bearing 14, to assemble the inverter-integrated motor 101.

In Embodiment 2, a inverter-integrated motor 101 is constituted by five elements, i.e., a rotor 2, a stator 5, a front housing 12a, a motor housing 21, and an inverter module 25a. The inverter module 25a is mounted to the motor housing 21 such that surfaces of inverters 26a and 26b that are exposed from a molded resin portion 34 contact a non-output-end end surface of the motor housing 21, such that heat that is generated by the inverters 26a and 26b is transferred to the front housing 12a.

Consequently, similar or identical effects to those in Embodiment 1 above can also be achieved in Embodiment 2.

According to Embodiment 2, because the stator 5 is fixed to the motor housing 21 by press-fitting or shrinkage fitting, members that fix the stator 5 are no longer required, enabling further reductions in cost to be achieved.

Because the motor housing 21 is a press-molding, it can be configured so as to be thin, enabling the axial length of the inverter-integrated motor 101 to be reduced.

Because the resolver terminals 38 and the circuit board 28, and the motor terminals 11a and 11b and the inverter terminals 33c and 33d, are respectively electrically connected by press-fitting, a step of connecting by welding is no longer required, enabling assembly man-hours to be further reduced.

Because the heat radiating grease 22 is disposed between the inverters 26a and 26b and the front housing 12a, heat transference between the inverters 26a and 26b and the front housing 12a is improved, enabling the heat generated in the inverters 26a and 26b to be transferred to the front housing 12a efficiently.

Moreover, in Embodiment 2 above, a resolver is used as a rotation sensor, but other types of sensors such as magnetic sensors, etc., may be used.

In Embodiment 2 above, the resolver terminals 38 and the circuit board 28, and the motor terminals 11a and 11b and the inverter terminals 33c and 33d, are electrically connected by press-fitting, but the electrical connecting method is not limited to press-fitting, and may be welding, crimping, screw fastening, soldering, etc.

In Embodiment 2 above, the inverter module 25a is glued to the motor housing 21, but the method for mounting the inverter module 25a to the motor housing 21 is not limited to adhesive, and may be screw fastening, crimping, thermal adhesion, etc.

In Embodiment 2 above, the heat radiating grease 22 is disposed between the inverters 26a and 26b and the front housing 12a, but heat radiating sheets may be disposed between the inverters 26a and 26b and the front housing 12a.

In Embodiment 2 above, a power portion and a control portion are integrated to form a single member by molding, but the method for integrating the power portion and the control portion is not limited to molding provided that the effects can be achieved in a similar manner.

Embodiment 3

Figure 10:
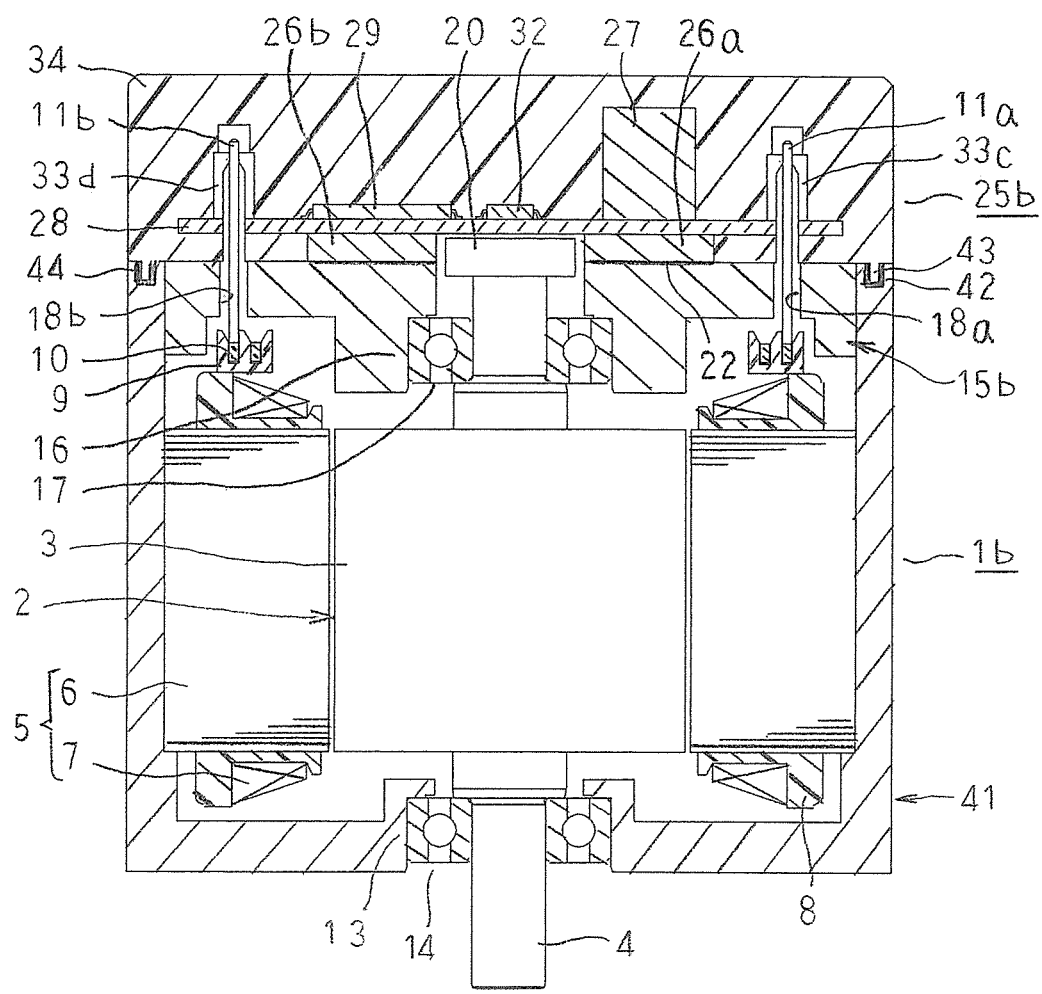
FIG. 10 is a longitudinal cross section that shows an inverter-integrated motor according to Embodiment 3 of the present invention.
Figure 11:
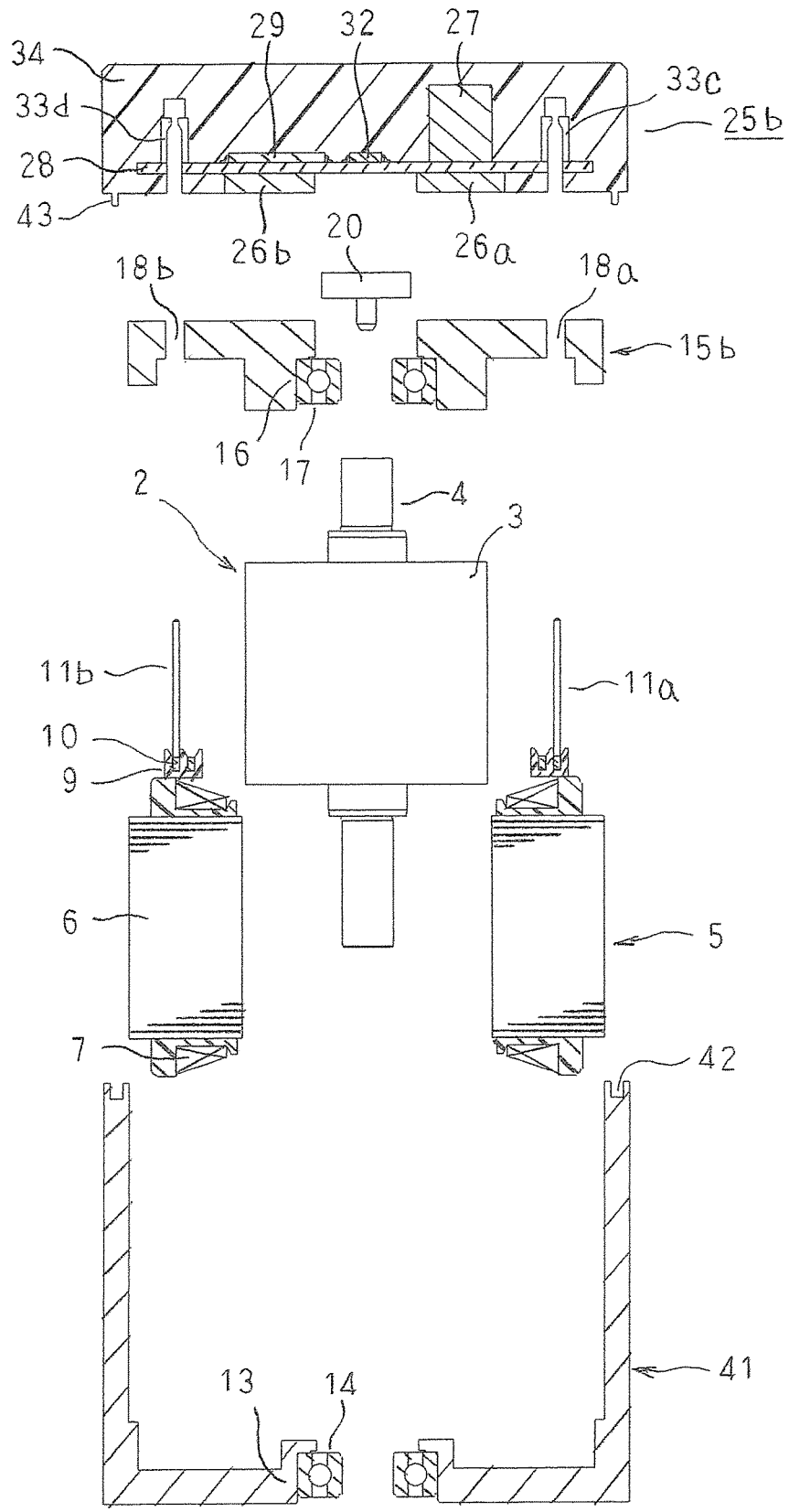
FIG. 11 is a longitudinal cross section that shows an exploded state of the inverter-integrated motor according to Embodiment 3 of the present invention.
Figure 12:
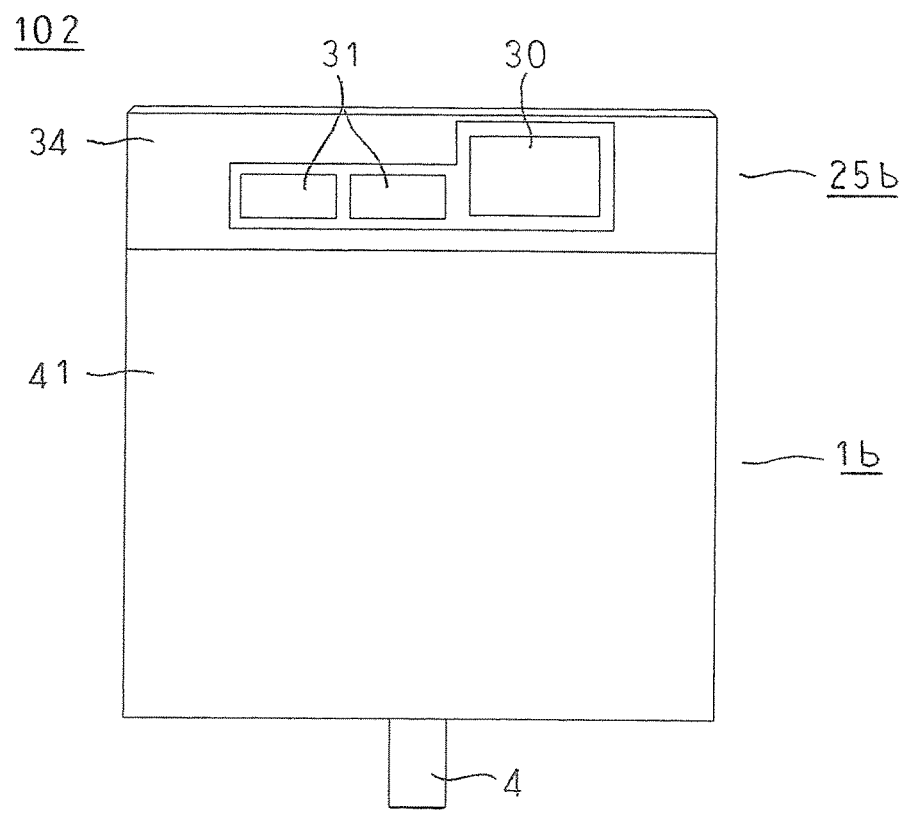
FIG. 12 is a side elevation that shows the inverter-integrated motor according to Embodiment 3 of the present invention.
Figure 13:
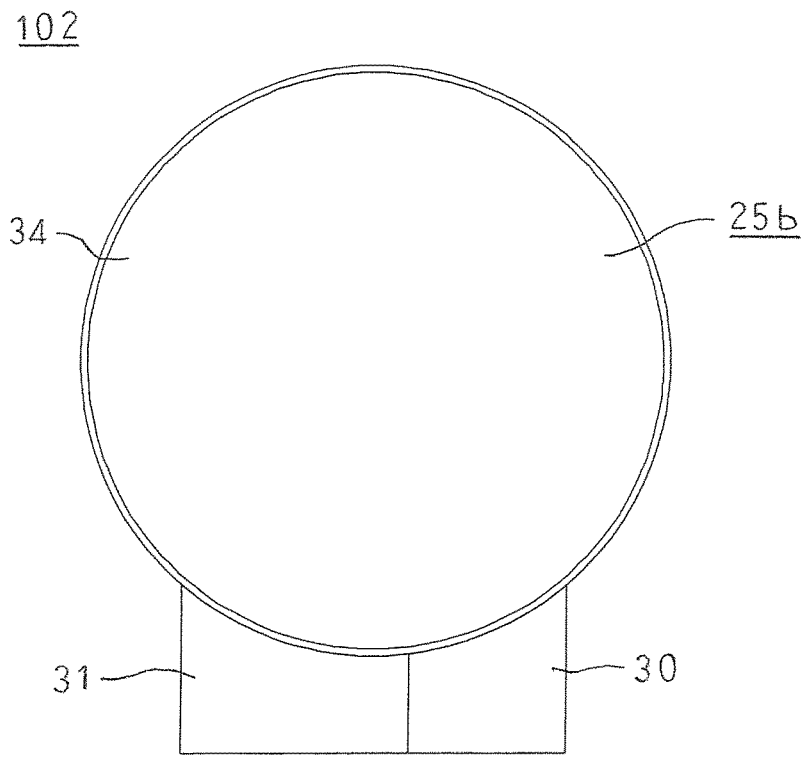
FIG. 13 is an end elevation that shows the inverter-integrated motor according to Embodiment 3 of the present invention when viewed from a non-output shaft end.

FIG. 10 is a longitudinal cross section that shows an inverter-integrated motor according to Embodiment 3 of the present invention, FIG. 11 is a longitudinal cross section that shows an exploded state of the inverter-integrated motor according to Embodiment 3 of the present invention, FIG. 12 is a side elevation that shows the inverter-integrated motor according to Embodiment 3 of the present invention, and FIG. 13 is an end elevation that shows the inverter-integrated motor according to Embodiment 3 of the present invention when viewed from a non-output shaft end. Moreover, in FIGS. 10 and 11, a longitudinal cross section is depicted except for the rotor.

In FIGS. 10 through 13, in an inverter-integrated motor 102, a motor 1b and an inverter module 25b are arranged in an axial direction of the motor 1b and integrated.

The motor 1b is a permanent-magnet synchronous motor that includes a rotor 2, a stator 5, and a motor housing 41 and a rear housing 15b that function as a housing, supply of electric current to and driving thereof being controlled by an inverter module 25b.

The rotor 2 includes: a rotor core 3 in which permanent magnets (not shown) are embedded; and a shaft 4 that is inserted through a central axial position of the rotor core 3 and fixed to the rotor core 3.

The stator 5 includes a stator core 6 that is produced by stacking and integrating electromagnetic steel sheets; and a stator coil 7 that is mounted to the stator core 6 so as to have insulators 8 interposed. In the stator coil 7, two sets of three-phase coils are respectively configured into two sets of three-phase alternating-current windings that are wye-connected or delta-connected using winding terminals 10. Motor terminals 11a and 11b that function as output wires of the two sets of three-phase alternating-current windings are formed on the winding terminals 10.

The motor housing 41 is a die-casting of an aluminum alloy, is produced so as to have a floored cylindrical shape, and a front bearing box portion 13 that houses a front bearing 14 that supports an output-end end portion of the shaft 4 is formed at a central axial position of a floor portion thereof. A sealing recess portion 42 is recessed into a non-output-end end surface of the cylindrical portion of the motor housing 41 so as to have a ring shape.

The rear housing 15b is a die-casting of an aluminum alloy, is produced so as to have a disk shape that has an outside diameter that is equal to an inside diameter of the cylindrical portion of the motor housing 41, and a rear bearing box portion 16 that houses a rear bearing 17 that supports a non-output-end end portion of the shaft 4 is formed at a central axial position thereof. Apertures 18a and 18b for passage of motor terminals 11a and 11b are formed on the rear housing 15b.

The stator 5 is held in the motor housing 41 by the stator core 6 being inserted into and fixed inside the cylindrical portion of the motor housing 41 by press-fitting or shrinkage fitting. At the same time, the rear housing 15b closes the motor housing 41 by being inserted into and fixed inside the cylindrical portion of the motor housing 41 by press-fitting or shrinkage fitting. Here, the motor terminals 11a and 11b protrude outward at the non-output end through the apertures 18a and 18b that are formed on the rear housing 15b. The rotor 2 is rotatably disposed inside the stator 5 so as to have an extremely small air gap interposed such that the two ends of the shaft 4 are supported by the front bearing 14 that is housed in the front bearing box portion 13 and the rear bearing 17 that is housed in the rear bearing box portion 16a, to assemble the motor 1b. In addition, a sensor magnet 20 that constitutes a detected portion of a rotation sensor is mounted to the non-output-end end portion of the shaft 4, which protrudes out of the rear housing 15b.

The inverter module 25b includes: a power portion through which is passed a driving current that drives the motor 1b; and a control portion that controls driving of the motor 1b. The power portion is constituted by two sets of inverters 26a and 26b, smoothing capacitors 27, etc., each of the sets being constituted by power elements such as power MOSFETs, etc., for three phases, and is mounted to the circuit board 28. The control portion is constituted by a microcomputer 29, an FET driving circuit (not shown), circuit elements (not shown), etc., and is mounted to the circuit board 28. An electric power supply connector 30 and a signal connector 31 are also disposed on the inverter module 25a, and are connected to the power portion and to the control portion by means of terminals (not shown). A sensor IC 32 that constitutes a detecting portion of the rotation sensor is mounted to the circuit board 28. Inverter terminals 33c and 33d are electrically connected to the inverters 26a and 26b, and are mounted to the circuit board 28.

The inverter module 25b is a molded body that is produced by molding together the power portion and the control portion that are configured in this manner. Here, the electric power supply connector 30 and the signal connector 31 are insert-molded, and are formed integrally into a molded resin portion 34. The inverters 26a and 26b are exposed on a first surface of the molded resin portion 34. The molded resin portion 34 is produced so as to have a disk shape that has an outside diameter that is equal to an outside diameter of the cylindrical portion of the motor housing 41. A protruding portion 43 is formed on an outer circumferential edge portion of a first surface of the molded resin portion 34 so as to have a ring shape. The circuit board 28 is exposed at a central axial portion of the first surface of the molded resin portion 34, and the sensor IC 32 is mounted to an opposite side of the circuit board 28 from the portion that is exposed from the molded resin portion 34.

The inverter-integrated motor 102 is assembled by fixing the molded resin portion 34 to the non-output-end end surface of the rear housing 15b using adhesive such that the inverters 26a and 26b face toward the rear housing 15b and the sensor IC 32 faces the sensor magnet 20 so as to have the circuit board 28 interposed, and mounting the inverter module 25b to the motor 1b approximately coaxially. Here, the protruding portion 43 is inserted into the sealing recess portion 42, and a waterproof sealing material 44 such as a silicone resin, etc., is filled between the sealing recess portion 42 and the protruding portion 43, to constitute a waterproof seal portion. The motor terminals 11a and 11b are inserted into apertures that are respectively formed on the molded resin portion 34 and the circuit board 28, and are press-fitted into the inverter terminals 33c and 33d, such that the control portion is electrically connected to the stator coil 7. The inverters 26a and 26b are in contact with the non-output-end end surface of the motor housing 41 so as to have a heat radiating grease 22 interposed.

In Embodiment 3, a inverter-integrated motor 102 is constituted by five elements, i.e., a rotor 2, a stator 5, a motor housing 41, a rear housing 15b, and an inverter module 25b. The inverter module 25b is mounted to the rear housing 15b such that surfaces of inverters 26a and 26b that are exposed from a molded resin portion 34 contact a non-output-end end surface of the rear housing 15b, such that heat that is generated by the inverters 26a and 26b is transferred to the rear housing 15b.

Consequently, similar or identical effects to those in Embodiment 1 above can also be achieved in Embodiment 3.

According to Embodiment 3, because the stator 5 is fixed to the motor housing 41 by press-fitting or shrinkage fitting, members that fix the stator 5 are no longer required, enabling further reductions in cost to be achieved.

Because the rear housing 15b is fixed to the cylindrical portion of the motor housing 41 by press-fitting or shrinkage fitting, and the inverter module 25b is fixed to the rear housing 15b using an adhesive, projections that protrude radially outward that were required when fixing components by fastening through-bolts or screws are no longer required, enabling increases in radial dimensions of the inverter-integrated motor 102 to be suppressed.

Because a sensor IC 32 that constitutes a detecting portion of a rotation sensor is integrated with the inverter module 25b, a step of installing the sensor IC 32 is no longer necessary, enabling assembly man-hours to be further reduced, and enabling reductions in cost to be achieved.

Because the motor terminals 11a and 11b and the inverter terminals 33c and 33d are electrically connected by press-fitting, a step of connecting by welding is no longer required, enabling assembly man-hours to be further reduced. Because the heat radiating grease 22 is disposed between the inverters 26a and 26b and the rear housing 15b, heat transference between the inverters 26a and 26b and the rear housing 15b is improved, enabling the heat generated in the inverters 26a and 26b to be transferred to the rear housing 15b efficiently.

A protruding portion 43 that is formed on an outer circumferential edge portion of the first surface of the molded resin portion 34 so as to have a ring shape is inserted into a sealing recess portion 42 that is formed on an end surface of the cylindrical portion of the motor housing 41 so as to have a ring shape, and a waterproof sealing material 44 is filled between the sealing recess portion 42 and the protruding portion 43, to constitute a waterproof seal portion. Thus, penetration of water droplets, etc., into the inverter-integrated motor 102 from outside can be prevented without mounting parts such as water-resistant covers thereto.

Moreover, in Embodiment 3 above, a magnetic sensor that includes a sensor magnet 20 and a sensor IC 32 is used as a rotation sensor, but other types of sensors such as resolvers, etc., may be used.

In Embodiment 3 above, the inverter module 25b is glued to the rear housing 15b, but the method for mounting the inverter module 25b to the rear housing 15b is not limited to adhesive, and may be screw fastening, crimping, thermal adhesion, etc.

In Embodiment 3 above, the heat radiating grease 22 is disposed between the inverters 26a and 26b and the rear housing 15b, but heat radiating sheets may be disposed between the inverters 26a and 26b and the rear housing 15b.

In Embodiment 3 above, the motor terminals 11a and 11b and the inverter terminals 33c and 33d are connected by press-fitting, but the method for joining the motor terminals 11a and 11b and the inverter terminals 33c and 33d is not limited to press-fitting, and may be welding, crimping, screw fastening, soldering, etc.

In Embodiment 3 above, the direction of removal of the electric power supply connector 30 and the signal connector 31 is a radial direction of the motor 1b, but the direction of removal of the electric power supply connector 30 and the signal connector 31 may be removal in an axial direction from a non-output-end end surface of the inverter module 25b.

In Embodiment 3 above, the rear housing 15b is joined to the cylindrical portion of the motor housing 41 by press-fitting or shrinkage fitting, but the rear housing 15b and the cylindrical portion of the motor housing 41 may be joined by welding, crimping, gluing, screw fastening, etc.

In Embodiment 3 above, a ring-shaped protruding portion 43 that is formed on a molded resin portion 34 of an inverter module 25b is fitted into a ring-shaped sealing recess portion 42 that is formed on an end surface of a cylindrical portion of a motor housing 41, and a waterproof sealing material 44 is filled between the protruding portion 43 and the sealing recess portion 42, to configure a waterproofing seal portion, but a waterproof seal portion may be configured by disposing an O-ring or a gasket between the molded resin portion 34 of the inverter module 25b and the end surface of the cylindrical portion of the motor housing 41.

In Embodiment 3 above, a power portion and a control portion are integrated by molding so as to be configured into a single member, but the method for integrating the power portion and the control portion is not limited to molding provided that the effects can be achieved in a similar manner.

The invention claimed is:

1. An inverter-integrated motor in which an inverter module and a motor are integrated so as to line up in an axial direction of said motor, wherein:
   said inverter module is configured into a single member in which are integrated:
      a power portion that comprises an inverter; and
      a control portion that comprises a microcomputer; and
   said motor comprises:
      a rotor;
      a stator; and
      a pair of housings that comprise bearings that support a shaft of said rotor,
   wherein:
   said inverter module is a molded body in which said power portion and said control portion are integrated;
   said inverter module is mounted to a surface at a non-output end of a housing, of said pair of housings, that has a bearing that supports a non-output end of said shaft; and
   said inverter is exposed from a molded resin portion of said inverter module, and a surface of said inverter that is exposed from said molded resin portion contacts said surface at said non-output end of said housing to which said inverter module is mounted.

2. The inverter-integrated motor according to claim 1, wherein a first housing of said pair of housings is produced so as to have a floored cylindrical shape, said stator being disposed inside said first housing.

3. The inverter-integrated motor according to claim 1, wherein a thermally conductive member is disposed between said surface of said inverter that is exposed from said molded resin portion and said surface at said non-output end of said housing.

4. The inverter-integrated motor according to claim 1, further comprising:
   a rotation sensor detecting portion that is disposed on said inverter module; and
   a rotation sensor detected portion that is disposed on said rotor.

5. The inverter-integrated motor according to claim 1, wherein terminals of a stator coil of said stator and said inverter module are joined together by press-fitting.

6. The inverter-integrated motor according to claim 1, wherein said inverter is disposed on a circuit board, and said circuit board is exposed from said molded resin portion of said inverter module at a central axial portion.

7. An inverter-integrated motor in which an inverter module and a motor are integrated so as to line up in an axial direction of said motor, wherein:
   said inverter module is configured into a single member in which are integrated:
      a power portion that comprises an inverter; and
      a control portion that comprises a microcomputer; and
   said motor comprises:
      a rotor;
      a stator; and
      a pair of housings that comprise bearings that support a shaft of said rotor,
   wherein:
   said inverter module is a molded body in which said power portion and said control portion are integrated;
   said inverter module is mounted to a surface at a non-output end of a housing, of said pair of housings, that has a bearing that supports an output end of said shaft; and
   said inverter is exposed from a molded resin portion of said inverter module, and a surface of said inverter that is exposed from said molded resin portion contacts said surface at said non-output end of said housing to which said inverter module is mounted.

8. The inverter-integrated motor according to claim 7, wherein said inverter is disposed on a circuit board, and said circuit board is exposed from said molded resin portion of said inverter module at a central axial portion.

* * * * *